(12) United States Patent
Li

(10) Patent No.: US 8,537,544 B2
(45) Date of Patent: Sep. 17, 2013

(54) BUTTON ASSEMBLY FOR ELECTRONIC DEVICE

(75) Inventor: Bi-Feng Li, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 144 days.

(21) Appl. No.: 13/309,701

(22) Filed: Dec. 2, 2011

(65) Prior Publication Data

US 2013/0033802 A1    Feb. 7, 2013

(30) Foreign Application Priority Data

Aug. 1, 2011 (CN) .......................... 2011 1 0217915

(51) Int. Cl.
*G06F 1/16* (2006.01)

(52) U.S. Cl.
USPC ................... 361/679.57; 345/179; 312/265.5; 248/176.3

(58) Field of Classification Search
USPC ................... 439/153, 620.01, 329, 342, 626; 248/274.1, 183.1, 183.2, 158, 176.1, 176.3; 174/564, 520, 560, 535, 561, 539, 369, 377, 174/383; 312/223.1, 223.2, 9.43, 323, 236, 312/265.5, 216; 345/156, 163, 179; 361/679.01, 679.02, 679.55, 679.33, 679.06, 361/679.09, 679.58, 679.31, 679.48, 679.37, 361/679.47, 679.54, 679.4, 679.46, 679.21, 361/679.38
See application file for complete search history.

(56) References Cited

U.S. PATENT DOCUMENTS

| | | | |
|---|---|---|---|
| 7,652,579 B2 * | 1/2010 | Keyaki et al. | 340/572.8 |
| 2013/0014550 A1 * | 1/2013 | Xie et al. | 70/69 |

* cited by examiner

*Primary Examiner* — Hung Duong
(74) *Attorney, Agent, or Firm* — Altis Law Group, Inc.

(57) ABSTRACT

A button assembly for an electronic device includes a housing and a button. The housing defines an opening having two latching blocks. The button is received in the opening. The button includes a button body, two opposite engaging blocks, and two arcuate arms. The engaging blocks are formed on opposite sides of one end of the button body, the arcuate arms are formed on opposite sides of another end of the button body. Each arcuate arm forms an archimedean spiral.

9 Claims, 3 Drawing Sheets

BUTTON ASSEMBLY FOR ELECTRONIC DEVICE

BACKGROUND

1. Technical Field

The present disclosure relates to button assemblies, particularly to a button assembly used in a portable electronic device.

2. Description of related art

Many portable electronic devices, such as mobile phones, have a housing defining an interior compartment for receiving a printed circuit board (PCB). The devices often include a button assembly on one side of the housing, allowing one-handed operation of the device.

The button of the button assembly is operated by pressing, and needs to rebound to an original position. The rebound force is provided by an elastic structure. However, the typical elastic structure makes the structure of the button assembly as a whole very complicated. Additionally, the elastic structure due to its shape may not rebound smoothly after being compressed and released.

Therefore, there is room for improvement within the art.

BRIEF DESCRIPTION OF THE DRAWINGS

Many aspects of the disclosed button assembly can be better understood with reference to the following drawings. The components in the drawings are not necessarily drawn to scale, the emphasis instead being placed upon clearly illustrating the principles of the present button assembly. Moreover, in the drawings, like reference numerals designate corresponding parts throughout the several views.

DETAILED DESCRIPTION

The disclosed button assembly may be applied in portable electronic devices such as mobile phones or personal digital assistants (PDA) in accordance with an exemplary embodiment. In the exemplary embodiment, the button assembly used in a mobile phone is illustrated, although the disclosure is not limited thereto.

Figure 1:
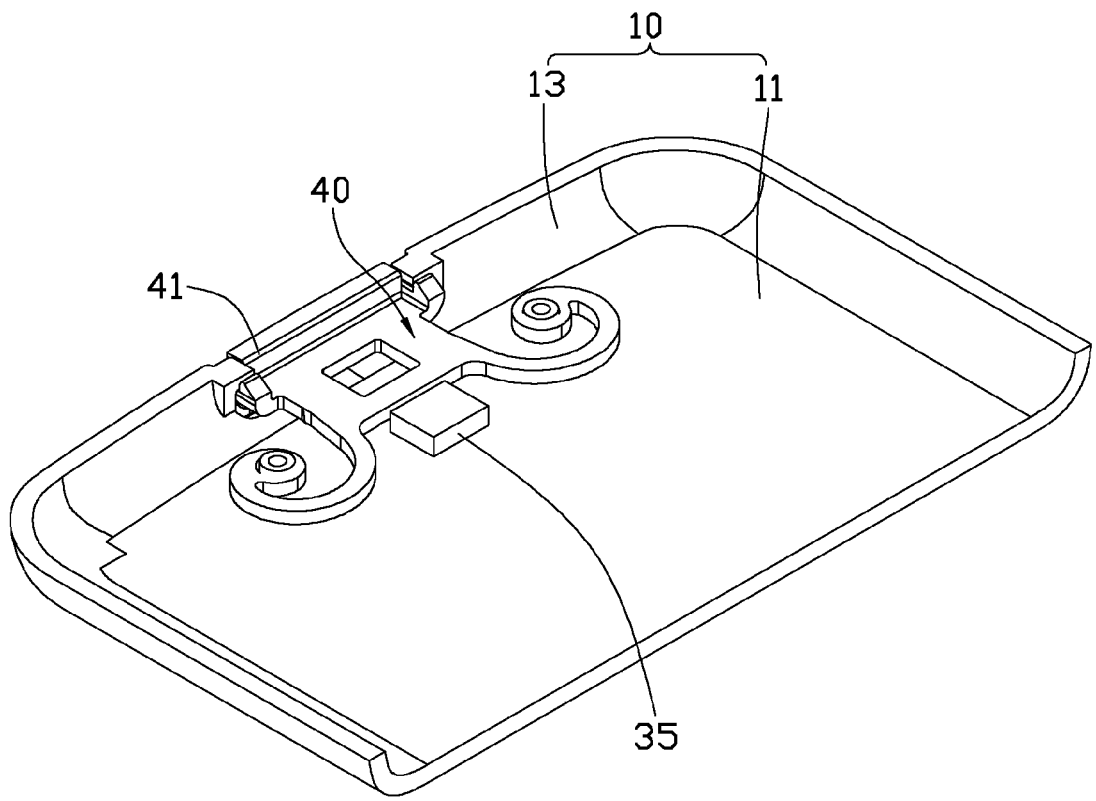
FIG. 1 is an assembled view of a portion of a portable electronic device using a button assembly in accordance with an exemplary embodiment.

FIG. 1 shows a portable electronic device (only a portion of which is shown) including a housing 10, a switch 35, and a button 40.

Figure 2:
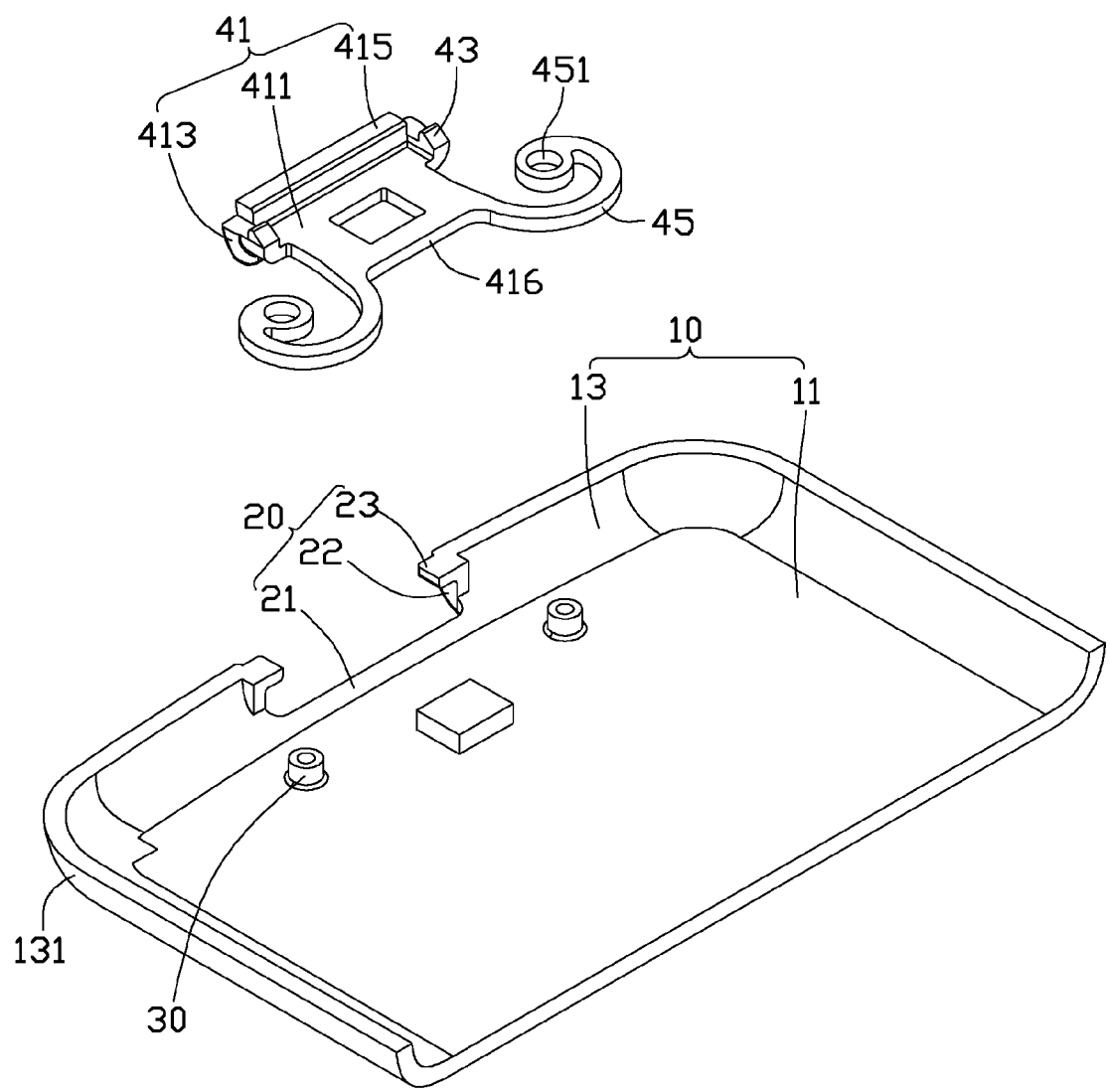
FIG. 2 is an exploded view of the button assembly in FIG. 1.
Figure 3:
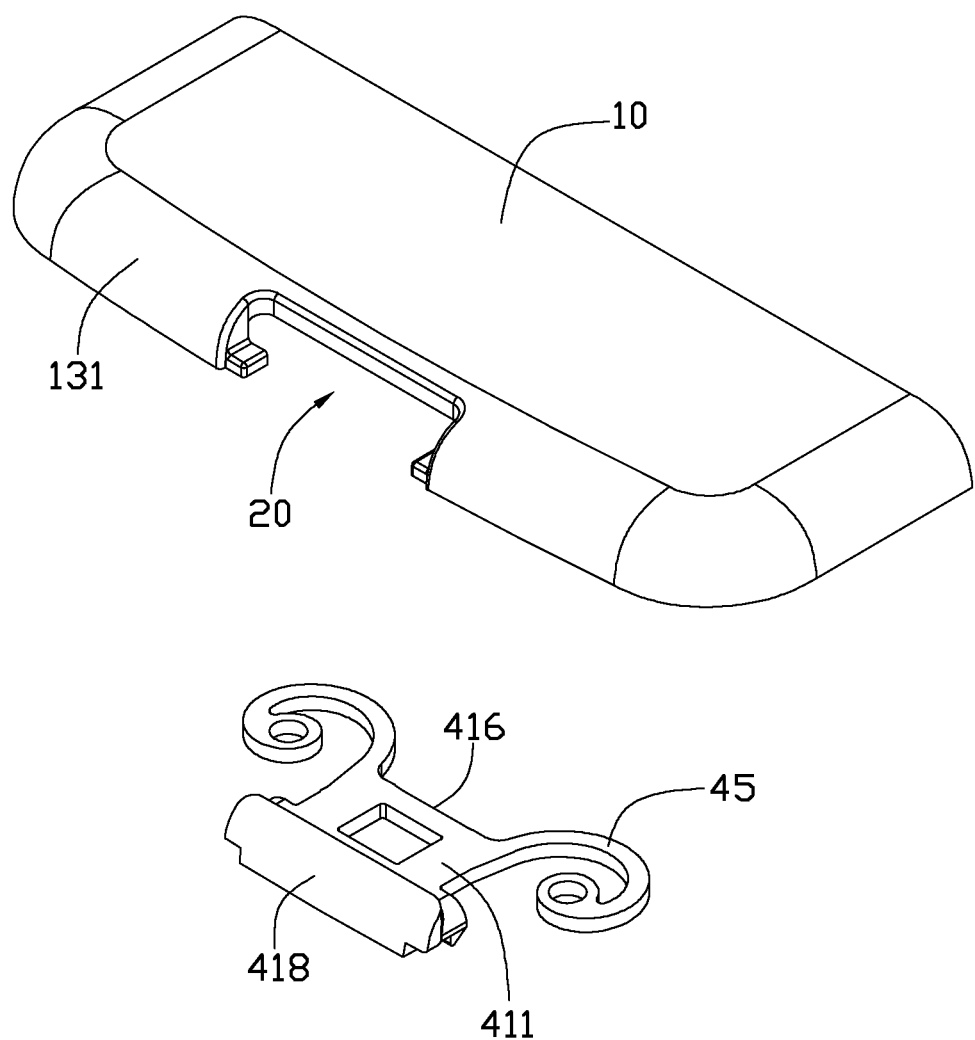
FIG. 3 is similar to FIG. 2, but showing another aspect thereof.

Referring to FIGS. 2 and 3, the housing 10 includes a base plate 11, and a sidewall 13. The sidewall 13 includes an outer surface 131. An opening 20 is defined in the sidewall 13. The opening 20 is defined by a first edge 21 and two opposite second edges 22. An L-shaped latching block 23 is formed on each second edge 22. Two posts 30 are formed on the base plate 11.

The button 40 is made of elastic material, and includes a button body 41, two opposite engaging blocks 43, and two arcuate arms 45 integrally formed together. The button body 41 includes a flat plate portion 411, and a press portion 413 is formed at one end of the plate portion 411. The press portion 413 includes an arcuate pressing surface 418. When the button 40 is engaged in the opening 20 of the housing 10, the pressing surface 418 is smoothly connected to the outer surface 131. A beam 415 is formed on the plate portion 411 opposite to the press portion 413, and is configured for being received between the latching blocks 23. The engaging blocks 43 are formed on opposite sides of one end of the plate portion 411, and are adjacent to the press portion 413. The engaging blocks 43 are latched with the latching blocks 23 to prevent the button 40 from separating from the housing 10.

The arcuate arms 45 are respectively formed at opposite sides of another end of the plate portion 411, and reversely extend toward outside. Each arcuate arm 45 forms an archimedean spiral. A distal end of each arcuate arm 45 has a loop 451, which is fitted around a corresponding post 30 for fixing one end of the arcuate arms 45.

The switch 35 is positioned between the posts 30. The plate portion 411 has a resisting end 416 between the arcuate arms 45 configured for activating the switch 35.

To assemble the button 40 to the housing 10, the button 40 is received in the opening 20 of the housing 10. The loops 451 are fitted around the posts 30 on the housing 10, and the beam 415 is positioned between the latching blocks 23. The engaging blocks 43 latch with the latching blocks 23. Accordingly, the button 40 is assembled on the housing 10. In an original state, the arcuate arms 50 accumulate a predetermined compressive force to allow the engaging blocks 43 to be tightly latched with the latching blocks 23.

In use, the pressing surface 418 of the button 40 is pressed, the press portion 413 moves the plate portion 411 toward the switch 35. The arcuate arms 45 gradually deform until the resisting end 416 activates the switch 35. After the button 40 is released, the arcuate arms 45 provide a rebound force to restore the plate portion 411.

Since the engaging blocks 43 latch with the latching blocks 23, the button 40 will not easily separate from the portable electronic device. Additionally, since the arcuate arms 45 form archimedes spirals, the arms 45 will gradually deform, and provide a smooth rebounding force to the button the button 40 when released after being pressed. The operation of the button 40 is more stable.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A button assembly for an electronic device, comprising:
   a housing defining an opening having two latching blocks; and
   a button received in the opening, the button including a button body, two opposite engaging blocks, and two arcuate arms, the engaging blocks formed on opposite sides of one end of the button body and engaging with the latching blocks, the arcuate arms formed on opposite sides of another end of the button body, each arcuate arm forming an archimedean spiral.

2. The button assembly as claimed in claim 1, wherein two posts are formed on the housing, a distal end of each arcuate arm has a loop, which is fitted around a corresponding post for fixing one end of the arcuate arms.

3. The button assembly as claimed in claim 1, wherein the button body includes a flat plate portion, and a press portion is formed at one end of the plate portion, a beam is formed on the plate portion opposite to the press portion for being received between the latching blocks.

4. An electronic device comprising:
a housing defining an opening; and
a button received in the opening, the button including a button body, and two arcuate arms, the arcuate arms formed on opposite sides of another end of the button body, each arcuate arm forming an archimedean spiral.

5. The electronic device as claimed in claim 4, wherein the housing includes two latching blocks between the opening, the button body includes a flat plate portion, and a press portion is formed at one end of the plate portion, a beam is formed on the plate portion opposite to the press portion for being received between the latching blocks.

6. The button assembly as claimed in claim 1, wherein the housing includes a base plate and a sidewall, and the opening is defined in the sidewall.

7. The button assembly as claimed in claim 6, wherein the opening is defined by a first edge and two opposite second edges, each latching block is formed on each second edge.

8. The electronic device as claimed in claim 4, wherein two posts are formed on the housing, a distal end of each arcuate arm has a loop, which is fitted around a corresponding post for fixing one end of the arcuate arms.

9. The electronic device as claimed in claim 4, wherein the opening is defined by a first edge and two opposite second edges, and each latching block is formed on each second edge.

* * * * *